Patented Jan. 4, 1927.

1,613,234

UNITED STATES PATENT OFFICE.

PHILIP ALEXANDER MACKAY, OF LONDON, ENGLAND, ASSIGNOR TO NATIONAL METAL AND CHEMICAL BANK LIMITED, OF LONDON, ENGLAND.

PRODUCTION OF TITANIUM OXIDE.

No Drawing. Application filed May 15, 1926, Serial No. 109,422, and in Great Britain May 28, 1925.

This invention relates to the treatment of titaniferous ores for the production of titanium oxide and other compounds for use in the manufacture of pigments and for other purposes, and has for its chief object a process of manufacture that is economical and can be easily and well regulated.

In the manufacture of titanium oxide from titaniferous ore the usual process is to grind ilmenite ($FeO,TiO_2$) (with or without previous concentration of the $TiO_2$ content) and decompose it with ordinary sulphuric acid. In order to start and assist in the reaction heat has to be produced and applied and the reaction even when thoroughly established is difficult to regulate. When the reaction is completed the resultant sulphate of titanium and iron is suitably treated to precipitate hydrated titanium oxide and the latter is separated from the remaining sulphate of iron by filtration.

According to the present invention I obviate the necessity of producing and applying heat for the reaction by treating the titanium ore in an appropriate physical state with oleum. Oleum may be described as a solution of sulphur trioxide in sulphuric acid.

It is important to observe that this is a process of directly treating titanium ores as distinct from treating manufactured titanium compounds. In carrying out the invention I use any convenient form of reaction pot or container as for example a cast iron pan and I prefer to run the acid gradually onto a mass of the damp finely powdered ilmenite. Alternatively I may drop the powdered ilmenite suitably moistened onto a quantity of the oleum but the reverse method is preferable as the reaction is then more easily controllable.

The reaction does not need the expenditure of applied heat as the heat developed between the oleum and the moisture naturally contained in the powdered ilmenite or deliberately attained therein is sufficient to start the reaction and the latter in fact proceeds exothermically to a conclusion.

The oleum is run gradually into the damp finely divided ilmenite, the speed of addition being such that the temperature rises gradually until the reaction reaches a conclusion. During the addition the mass is continuously or intermittently stirred and thereby a uniform reaction takes place. The quantity of oleum added to any known weight of ilmenite is substantially that required by the chemical equation representing the reaction, although if preferred a suitable excess of either ilmenite or oleum may be used without interfering with the regularity of the reaction. The resulting sulphates of titanium and iron are then used as such for any desired purpose or are treated in any desired manner to obtain a substantially pure titanium salt or oxide. In the case of desiring to obtain the oxide for example, the double sulphate may be diluted sufficiently to precipitate the bulk of the titanium as hydrated oxide, which may then be separated by filtration in the usual way. Other titanium compounds may of course be prepared in any known way either from the sulphate or from the oxide.

What I claim is:—

1. In the production of titanium compounds, the step of treating damp powdered titaniferous ore with oleum.

2. In the production of titanium compounds, the step of gradually adding oleum to a damp powdered mass of titaniferous ore.

3. In the production of titanium compounds, the step of gradually adding oleum to a damp powdered mass of ilmenite and stirring the mass during the period of addition.

4. The production of titanium oxide direct from titaniferous ore without the expenditure of applied heat, consisting in adding oleum gradually to a damp powdered mass of titaniferous ore, diluting the resultant mixture of iron and titanium sulphates sufficiently to precipitate hydrated titanium oxide and separating the latter from the liquid.

5. The production of titanium oxide direct from titaniferous ore without the expenditure of applied heat, consisting in adding oleum gradually to a damp powdered mass of titaniferous ore, diluting the resultant mixture of iron and titanium sulphates sufficiently to precipitate hydrated titanium oxide, stirring the mass during the period of addition to maintain a uniform reaction, and separating the hydrated titanium oxide from the liquid.

6. The production of titanium compounds direct from titaniferous ore, consisting in bringing the damp powdered ore and oleum into direct contact with each other.

7. In the production of titanium compounds direct from titaniferous ore, the step of treating a damp finely divided mass of ilmenite with oleum added gradually and at a rate such that the temperature of the reaction rises gradually, and stirring the mass during the period of addition.

In testimony whereof I have signed my name to this specification.

PHILIP ALEXANDER MACKAY.